United States Patent
Itoh

[11] 4,412,353
[45] Oct. 25, 1983

[54] MIXING CIRCUIT

[76] Inventor: Shinobu Itoh, 5-6-10-401, Shinkawa, Mitaka-shi, Tokyo, Japan

[21] Appl. No.: 113,978

[22] Filed: Jan. 21, 1980

[30] Foreign Application Priority Data

Jan. 19, 1979 [JP] Japan .................................. 54-4971

[51] Int. Cl.³ ............................................ H04M 1/58
[52] U.S. Cl. ................................. 455/323; 179/81 A
[58] Field of Search ............... 455/78, 323, 330, 333; 179/81 A, 81 R; 307/44, 51

[56] References Cited

U.S. PATENT DOCUMENTS

| 3,339,140 | 8/1967 | Pace | 455/78 |
| 3,546,395 | 12/1970 | Schuh | 179/81 A |
| 3,681,538 | 8/1972 | Matsuda | 179/81 A |
| 3,708,630 | 1/1973 | Matsuda | 179/81 A |
| 3,748,399 | 7/1973 | Matsuda | 179/81 A |
| 4,071,713 | 1/1978 | Sencer | 179/81 A |
| 4,143,247 | 3/1979 | Yoshitoshi | 179/81 R |

Primary Examiner—Tommy P. Chin
Attorney, Agent, or Firm—Murray Schaffer

[57] ABSTRACT

A mixing circuit having a first signal source, a series connection of a load circuit and in impedance circuit connected in parallel to the first signal source. A second signal source and an active element which has a main electrode connected to both ends of the source. In this case, a mixed signal of the signal from the first and second signal sources is derived from the load circuit.

12 Claims, 2 Drawing Figures

MIXING CIRCUIT

BACKGROUND OF THE INVENTION

FIELD OF THE INVENTION

This invention relates generally to a mixing circuit and is directed more particularly to a signal mixing circuit suitable for use with, for example local intercommunication devices, such as two-way radios or telephones. The present invention relates also to a transmitter-receiver for such intercommunication.

DESCRIPTION OF THE PRIOR ART

In general, transmitter and receiver circuits used in, for example, in locales such as construction sites, studio: within a broadcast station or the like are so constructed that instructions can be transmitted to a number of persons at the same time and mutual communication is possible, if necessary. Therefore, the transmitter and receiver of each person is selected small in sound volume such that each person's talk is not leaked to the associated or even other receiver or is ascertained by them.

Further, since the transmitter and receiver circuits are connected in parallel so as to be able to make mutual communication among many persons, the power consumption is large. Therefore, it is desired that the above function be performed with less power consumption.

OBJECTS AND SUMMARY OF THE INVENTION

Accordingly, an object of the invention is to provide a novel mixing circuit meeting with the above purpose.

Another object of the invention is to provide a mixing circuit by which various sounds can be mixed or superimposed by simple construction and also an unnecessary signal can be cancelled, if desired.

According to an aspect of the invention, a mixing circuit is provided which comprises:

(A) first and second signal sources, (B) a series connection of a load circuit and an impedance circuit connected in parallel to said first signal source, (C) an active element having a main current path connected in parallel across said load circuit and a control electrode connected to said second signal source, in which a mixed signal component of first and second signals from said first and second signal sources is derived from said load circuit.

According to another aspect of the present invention, a transmitter receiver is provided comprising (a) a pair of input terminals;

(b) a transmitter;

(c) a receiver;

(d) an active element connected to said receiver;

(e) a buffer amplifier connected to said transmitter; and (f) a circuit for coupling an output from said transmitter to said active element and buffer amplifier to attenuate the output from said transmitter whereby to avoid the output from said transmitter being supplied to said receiver.

The other objects, features and advantages of the present invention will become apparent from the following description taken in conjunction with the accompanying drawings through which the like references designate the same elements.

DESCRIPTION OF THE PREFERRED EMBODIMENT

The present invention will be hereinafter described with reference to the drawings.

Figure 1:
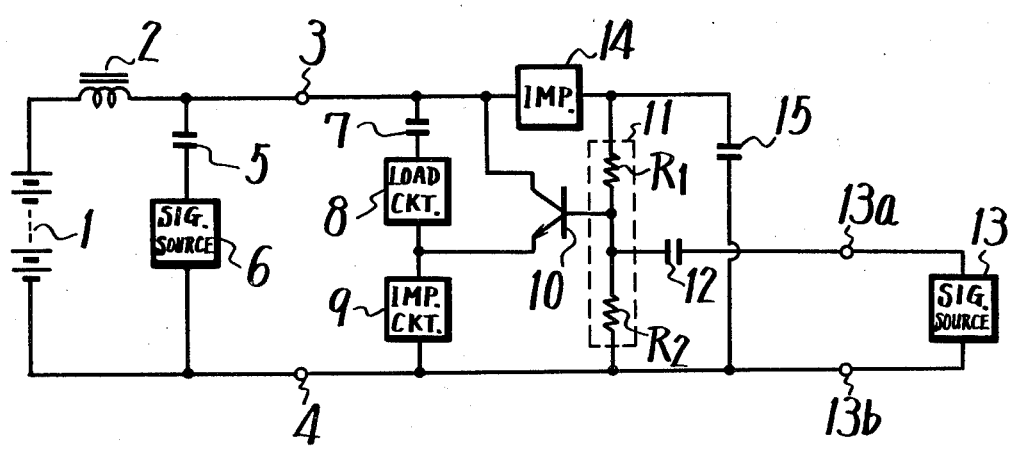
FIG. 1 is a circuit diagram showing, the mixing circuit of the present invention, and, FIG. 2 is a circuit diagram showing an example of a transmitter-receiver to which this invention is applied.

FIG. 1 is a circuit diagram showing an example of the mixing circuit according to this invention. In FIG. 1, 1 designates a power source whose one end is connected through a high impedance element such as a choke coil 2 to an input terminal 3 and whose other end is connected to another input terminal 4. Between input terminals 3 and 4 there is connected a first signal source 6 in parallel to the power source 1 through a capacitor 5 which can be omitted if necessary. The choke 2 is provided to prevent the signal current from signal source 6 from flowing into the power source side and hence avoiding attenuation of the signal component. A series connection of a load circuit 8 and an impedance circuit 9 is connected in series between input terminals 3 and 4 through a coupling capacitor 7 which can be omitted if desired. The impedance circuit 9 may be, for example, a resistor, an inductor a, constant current source or the like. As will be described later, the impedance circuit 9 is connected to an active element such as a transistor 10 at its emitter, which transistor 10 is of a common-base type, and the effective impedance thereof is low for the signal from the first signal source 6, and hence its insertion loss poses no problem.

To the connection point between load circuit 8 and impedance circuit 9, there is connected the emitter of an active element such as a transistor 10 whose collector is connected to one terminal of load circuit 8 through coupling capacitor 7 and whose base is connected to the connection point between resistors R1 and R2 of a basing circuit 11. This latter connection point is in turn connected to a reference potential or common point through the resistor R2 and also connected through a capacitor 12 to a terminal 13a which is connected through a second signal source 13 to another terminal 13b which is connected to the free end of the resistor R2. The free end of resistor R1 is connected to the terminal 3 through a high impedance element 14 and also to the reference potential through a capacitor 15. The high impedance element 14 is in parallel to the load circuit 8 viewed from the collector of transistor 10 to function so as to reduce external influences.

The base of transistor 10 is connected to the common point through capacitor 12 and the second signal source of loss internal impedance so that transistor 10 serves as the common base type 12 amplifier circuit to present a high input impedance. Therefore, it is desired that the internal impedance of second signal source 13, which is connected between terminal 13a connected to capacitor 12 and terminal 13b which is grounded, is selected such that it does not lower the high input impedance of the above base-grounded type amplifier circuit.

When the circuit is viewed from the second signal source 13, this circuit is of an emitter follower circuit with high input impedance. Thus, across the impedance circuit 9 and its series connected load circuit 8, there appears a second signal with substantially the same amplitude and phase as those of the first signal so that the second signal is mixed in series with the first signal supplied to the load circuit 8 from the first signal source 6.

The operation of the mixing circuit of this invention will now be described. When the first signal current is fed from first signal source 6 to load circuit 8, this signal also flows through impedance circuit 9 in series with load circuit 8. Thus, the potential across impedance circuit 9 is varied in response to the variation of the input signal i.e. load current. At this time, the base-emitter potential of transistor 10, which is energized by biasing circuit 11, is varied, and accordingly the emitter current of transistor 10 is varied. That is, transistor 10 operates to complement the varied current component by the potential variation of impedance circuit 9 so that a constant current always flows through impedance circuit 9. In this case, the current flowing through load circuit 8 is reverse in phase to that flowing through the collector of transistor 10, namely when one of the currents increases, the other decreases or vice versa or they flow complementary. Accordingly, it is sufficient that the input signal fed externally to input terminals 3 and 4 in only an input voltage or a small input current.

When the second signal is supplied to the base of transistor 10 from second signal source 13, this signal is derived across the load circuit 8 and also delivered across impedance circuit 9 serving as the load. That is, the potential generated across impedance circuit 9 is also varied by the second signal. In this case, transistor 10 performs the emitter follower operation. Since the second signal from second signal source 13 is delivered across load circuit 8 and also across impedance circuit 9, if its phase, amplitude and the like relative to those of the first signal from first signal source 6 through load circuit 8 are taken into consideration, it is possible by the circuit shown in FIG. 1 that there is derived a desired signal such as a signal, in which the first and second signals are mixed, for example, one of the signals is superimposed on the other signal, only one signal of the two signals or the other signal being removed.

Figure 2:
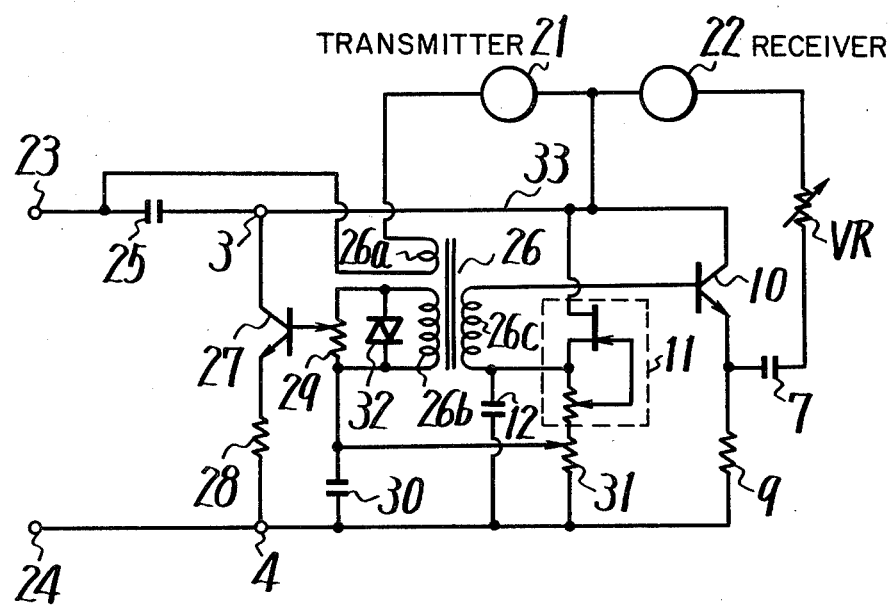

FIG. 2 is a circuit diagram showing a transmitter-receiver in which the example of this invention shown in FIG. 1 is used, so that in FIG. 2 the parts and elements corresponding to those in FIG. 1 are marked with the same references and their detailed description will be omitted.

In FIG. 2, 21 and 22 respectively designate a transmitter and a receiver which can be connected through plugs. The transmitter 21 corresponds to the second signal source 13 of FIG. 1 and receiver 22 corresponds to load circuit 8 of FIG. 1, respectively. The sound volume of receiver 22 can be adjusted by a variable resistor VR connected between capacitor 7 and receiver 22.

In FIG. 2, 23 designates an external input terminal which is connected through a capacitor 25 to the input terminal 3 and also through a primary winding 26A of a transformer 26 to the transmitter 21. Capacitor 25 serves to by-pass the signal component, or the transmitting or receiving signal is delivered to the outside or received through capacitor 25.

A transistor 27 is provided in the transmitter portion to form a buffer amplifier of a high output impedance. The collector of transistor 27 is connected to input terminal 3, the emitter thereof is connected through a resistor 28 to input terminal 4 which is connected to an external input terminal 24, and the base thereof is connected to the movable piece of a variable resistor 29 which is connected in parallel to a secondary winding 26b of transformer 26. One end of variable resistor 29 is grounded connected to the common point through a capacitor 30 and also connected to the movable piece of a variable resistor 31 which is connected between the biasing circuit 11 and common point.

A switching element 32 is connected in parallel to the secondary winding 26b of transformer 26. This switching element 32 serves as a limiter to cut off an excess signal component when it is induced across the secondary winding 26b during a talk through the transmitter 21.

A tertiary winding 26c is provided in transformer 26. A transmitting signal from transmitter 21 is induced across the secondary winding 26b, amplified by transistor 27 and then delivered to the outside. The transmitting signal is also induced across tertiary winding 26c and then fed to the base of transistor 10.

The operation of the circuit shown in FIG. 2 will be now described. A transmitting signal supplied to external input terminal 23 from a companion transmitter/receiver is supplied through capacitor 25 and input terminal 3 to receiver 22 which receives the same as a talk signal. The signal flowing through receiver 22 flows through variable resistor VR, capacitor 7, impedance circuit or resistor 9 and input terminal 4 to external input terminal 24.

On the other hand, the transmitting signal from transmitter 21 is induced across secondary winding 26b of transformer 26 through its primary winding 26a. The induced signal is amplified by transistor 27, then delivered to external input terminal 23 through input terminal 3 and capacitor 25 and then sent to the companion.

During sending of the talk signal to the companion through transmitter 21, a fear exists that the transmitting signal, which appears from transmitter 21 at input terminal 3 through primary winding 26a of transformer 26, its secondary winding 26b and transistor 27, will leak to receiver 22 through signal line 33. In the circuit of FIG. 2, however, the transmitting signal from transmitter 21 is partially induced on tertiary winding 26c and then fed to transistor 10 to cancel the above leaked transmitting signal. That is, the changed component of the transmitting signal, which is leaked to receiver 22 through input terminal 3 and signal line 33, also appears across resistor 9 connected to the emitter of transistor 10. The changed component of the potential appearing across resistor 9 can be cancelled by such a manner that transistor 10 is energized in the signal derived through tertiary winding 26c and the phase, amplitude and so on of the emitter current of transistor 10 are suitably set as described previously. As a result, the transmitting signal, which is leaked from transmitter 21 through primary and secondary windings 26a and 26b of transformer 26, transistor 27, input terminal 3 and signal line 33 to receiver 22, is substantially cancelled.

As described above, according to the circuit of this invention, a so-called side tone attenuation, which attenuates one's transmitting signal appearing at the receiver, becomes possible. Further, since the total impedance of the transmitter, receiver and bias circuits is high, even if a number of transmitter/receiver or telephone circuits are connected in parallel, the signal level is not lowered. In addition, if transistor 27 operating as the transmitter buffer amplifier is given with the function of current amplification, many more telephone circuits can be further connected in parallel with one another.

As described above, according to the mixing circuit of this invention, first and second signals are mixed by a circuit which is much simpler in construction and consumes less power. Further, if desired, both the signals may be superimposed or may cancel each other. Therefore, if the mixing circuit of this invention is used in various circuits which require the above functions, very useful and effective results can be presented.

Further, with the circuit of the invention, if a musical sound is supplied from the first signal source and another sound is supplied from the second signal source, the circuit of the invention can be used as an accompaniment instrument or the like.

It will be apparent that many modifications and variations could be effected by one skilled in the art without departing from the spirits or scope of the novel concepts of this invention.

I claim as my invention:

1. A mixing circuit comprising:
   (A) first and second signal sources;
   (B) a series connection of a load circuit and an impedance circuit connected in parallel to said first signal source;
   (C) an active element having a main current path in parallel across said load circuit and a control electrode connected to said second signal source; in which a mixed signal component of first and second signals from said first and second signal sources is derived from said load circuit, said series connection and active element cooperating to present high impedance.

2. A mixing circuit according to claim 1, further comprising means for biasing said active element.

3. A mixing circuit as claimed in claim 1, in which said active element is a transistor whose collector electrode is connected to one end of said load circuit, whose emitter electrode is connected to the other end of said load circuit, and whose base electrode is connected to said second signal source.

4. A mixing circuit as claimed in claim 2, in which said biasing means includes a transistor and a resistor.

5. A transmitter-receiver comprising:
   (A) a transmitter;
   (B) a buffer amplifier;
   (C) a coupling circuit for coupling said transmitter to said buffer amplifier;
   (D) a pair of input and/or output terminals connected to said buffer amplifier;
   (E) a receiver;
   (F) an active element;
   (G) an impedance circuit connected in series to said active element, said series connection being connected between said pair of input and/or output terminals, said receiver being connected in parallel to said active element, said coupling circuit coupling an output from said transmitter to said active element to attenuate the output from said transmitter thereby to prevent the output from said transmitter being supplied to said receiver, said active element and said impedance circuit cooperating to present a high impedance.

6. A transmitter-receiver according to claim 5, further comprising means for biasing said active element.

7. A transmitter-receiver as claimed in claim 5, in which said active element is a transistor whose collector electrode is connected to one end of said receiver, whose emitter electrode is connected to the other end of said receiver, and whose base electrode is connected to said coupling circuit.

8. A transmitter-receiver as claimed in claim 5, in which said biasing means includes a transistor and a resistor.

9. A transmitter-receiver as claimed in claim 5, in which said buffer means includes a transistor and a resistor.

10. A transmitter-receiver as claimed in claim 13 in which said buffer amplifier is connected to said transmitter in series when in DC operation.

11. A transmitter-receiver as claimed in claim 5 in which said coupling circuit includes a limiter to prevent inputs from being applied to said active element and said buffer amplifier from being excessive.

12. A transmitter-receiver as claimed in claim 5, in which said buffer amplifier has been provided with a resistor in series.

* * * * *